Dec. 25, 1934.  E. V. TAYLOR  1,985,671
BRAKE
Filed Dec. 8, 1928  2 Sheets-Sheet 1

INVENTOR.
Eugene V. Taylor
BY H. O. Clayton
ATTORNEY.

Dec. 25, 1934.  E. V. TAYLOR  1,985,671
BRAKE
Filed Dec. 8, 1928  2 Sheets-Sheet 2
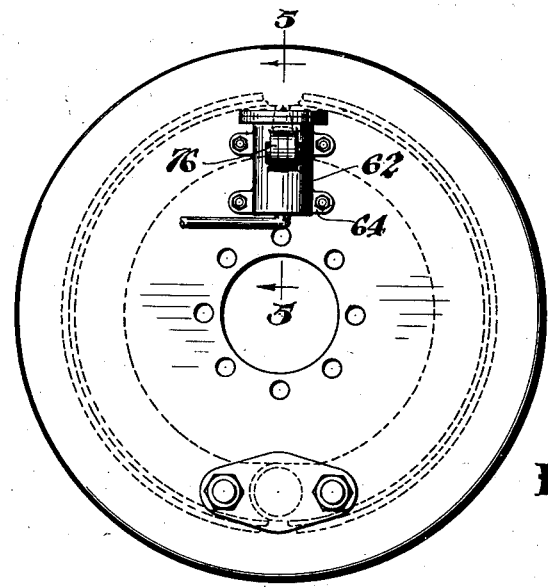
Fig. 4
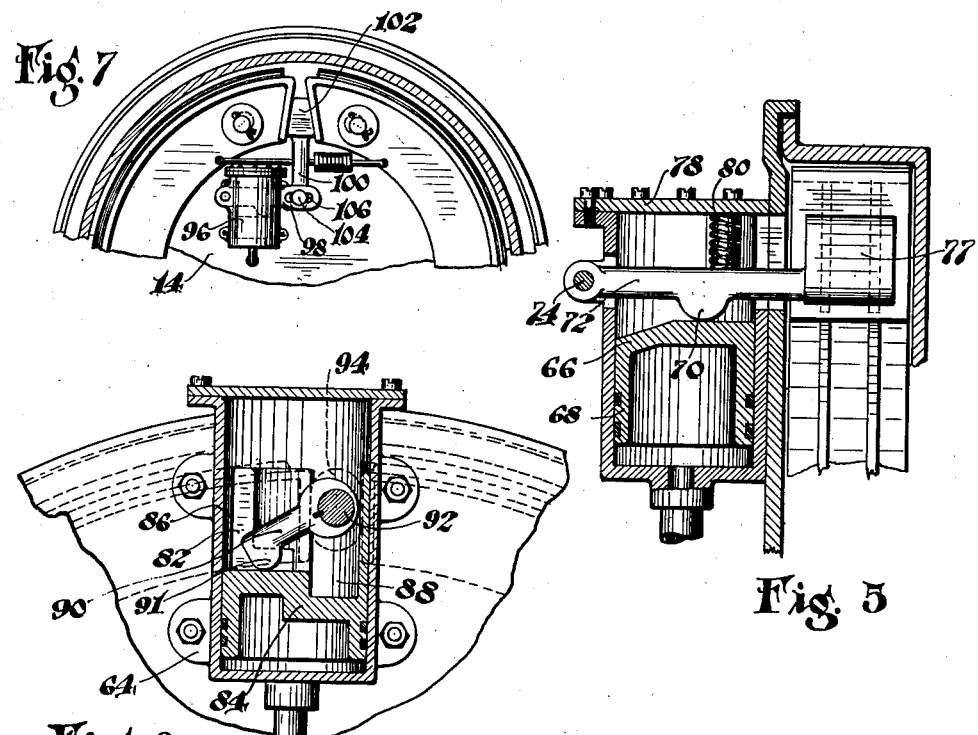
Fig. 7
Fig. 5
Fig. 6
INVENTOR.
Eugene V. Taylor
BY
ATTORNEY.

Patented Dec. 25, 1934

1,985,671

UNITED STATES PATENT OFFICE 1,985,671

BRAKE

Eugene V. Taylor, Chicago, Ill., assignor to Bendix Brake Company, South Bend, Ind., a corporation of Illinois Application December 8, 1928, Serial No. 324,759

2 Claims. (Cl. 188—152)

This invention relates to brakes and is illustrated as embodied in an internal expanding automotive brake of the fluid-operated type.

An object of the invention is to provide a simple and effective fluid power operator readily mounted on or within the brake backing plate and so constructed and arranged as to actuate a brake cam mechanism.

A further feature of the invention relates to a novel combination of fluid operator and lever wherein the lineal movement of a fluid-operated piston serves to propel a cam-actuating lever substantially housed by the operator, which lever functions to render operative the brake shoes or equivalent friction means. The aforementioned lever may be so mounted relative to the actuating piston as to function as a lever of either the second or third class.

Another feature of my invention embodies a toggle mechanism wherein the piston of the fluid operator serves to actuate a toggle, one link of which functions to thrust a wedge member into operative engagement with the friction means, spreading the same into drum contact.

The above and further features of my invention, including desirable particular constructions and combinations of parts will become apparent from the following detailed description of my invention illustrated in the accompanying drawings, in which:

Figure 4 is a view similar to Figure 1 disclosing a modified form of fluid operator and cam mechanism wherein the piston of the operator actuates a lever of the third class;

Figure 5 is a section taken on the line 5—5 of Figure 4;

Figure 6 is a sectional view similar to Figure 5 showing a modified form of piston and lever structure; and Figure 7 is a view disclosing the adaptability of the mechanism of Figure 5 for mounting within the backing plate.

Figure 1:
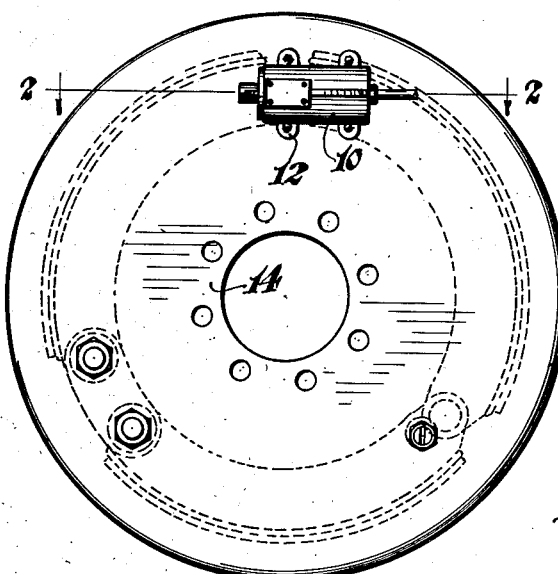
Figure 1 is a side elevation of a brake backing plate showing my novel fluid power operator attached thereto.
Figure 2:
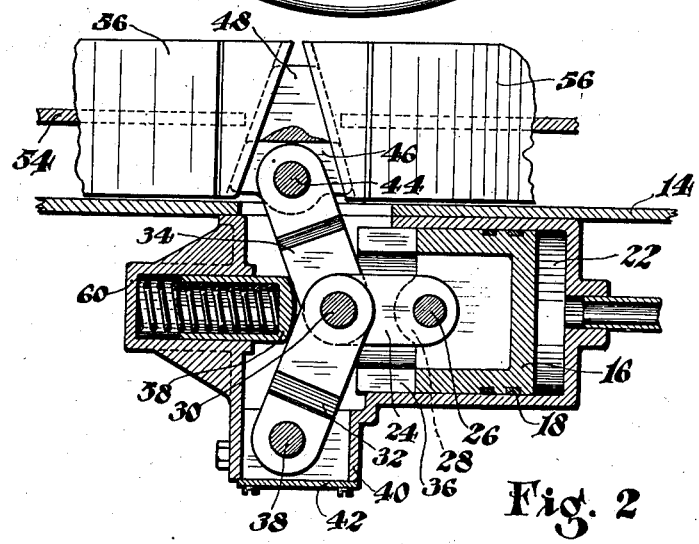
Figure 2 is a section taken on the line 2—2 of Figure 1, indicating in detail the operating parts of the fluid cylinder, together with the co-operating toggle links.

In that embodiment of my invention disclosed in Figures 1 and 2 a fluid power operator comprising a horizontally extending cylinder 10 is shown suitably bracketed at 12 to the brake backing plate or equivalent support 14. A piston 16, provided with the usual rings 18, may be mounted in one end of the cylinder, outlining, with the side and end walls of the cylinder, a fluid chamber 22.

According to an important feature of my invention, the piston is constructed and arranged to actuate a toggle which may include a thrust link 24 pivoted at one of its ends to a wrist pin 26 journaled in suitable bosses 28 in the side walls of the piston. Link 24 is preferably pivoted at its other end to a floating pin 30, which pin also forms a pivot for the juxtaposed thrust links 32 and 34 of the toggle, the end of the piston being preferably slotted at 36 to accommodate the said links. One end of link 32 may be anchored to a pin 38 journaled in the sides of a box-shaped open-ended projection 40 in the cylinder covered by a detachable plate 42. The remaining thrust link 34 is preferably extended through superposed openings in the cylinder wall and backing plate and pivoted at its outer end to a pin 44 journaled in the bifurcated ends 46 of a novel wedge-shaped cam block 48.

Figure 3:
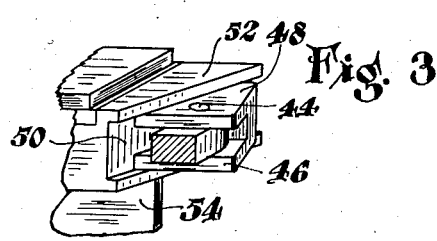
Figure 3 is an enlarged fragmentary detail of the wedge and associated brake shoe parts.

As disclosed in Figure 3, the wedge block is adapted to slide in inclined guideways 50 provided in the juxtaposed end faces of thrust blocks 52 secured to each end of the webs 54 of the brake shoes 56. A spring-pressed plunger 58 housed by a tubular extension 60 in the end of the cylinder serves to return the toggle and piston to their inoperative position with decrease of the fluid pressure in the cylinder.

In operation, movement of the piston, effected by the fluid pressure from any of the well known fluid (air or liquid) transmission systems, transmits through the toggle and wedge block the desired spreading movement of the brake shoes to apply the same to the rotating drum.

Passing now to that embodiment of my invention disclosed in Figures 4 and 5, I have here provided a vertically mounted fluid cylinder 62 bracketed at 64 to one side of the brake backing plate. The end wall 66 of a hollow piston 68 is adapted to contact a projection 70 intermediate the ends of a lever 72 fulcrumed at one end to a pin 74 journaled in ears 76 projecting from the cylinder wall. The lever projects through superposed slots in the cylinder and backing plate and at its other end there is provided an "axe head" shaped wedge member 77 fitting between the inclined end thrust plates on the webs of the brake shoes or the extremities of any other suitable friction means. A detachable cover plate 78 may be provided to render accessible the internal structure of the cylinder and a compression spring 80, confined between a lug on the plate 78 and a recess in the lever, functions to return the mechanism to its inoperative position with decrease of fluid pressure.

As disclosed in Figure 6, I have provided a third modification of my invention wherein the piston is provided with a sleeve 82 projecting from its end wall 84, which sleeve is slotted at 86 and 88 to accommodate respectively a lever 90 and a cam shaft 92. Lever 90 is preferably rounded at one end at 91 to contact the wall of the piston and may be keyed at its other end to the cam shaft 92 eccentrically mounted in said end. Shaft 92 is preferably journaled in the backing plate and is provided at its end with the usual two lobed cam 94 contacting the thrust plates of the friction retarding mechanism.

Actuation of the fluid-operated pistons in Figures 5 and 6 transmits lineal and rotary movement respectively to the cam levers, providing simple and effective transmission between a fluid power operator and the shoe contacting cam. It is also to be noted that third and second class levers are presented in the constructions of Figures 5 and 6 respectively.

As disclosed in Figure 7, the operating mechanism suggested in Figure 5 may readily be adapted to the interior of the brake structure outlined by the brake drum and backing plate. As illustrated, the fluid cylinder 96 may be bracketed to the inner face of the plate 14, its lever 98 being preferably bifurcated at its force transmitting end to straddle the stem 100 of the wedge cam 102. A pin 104 journaled in the stem, passes through slots 106 in the lever end permitting a pivotal movement between the parts.

While several embodiments of my invention have been disclosed and described in detail, it is not my intention to limit the scope of the invention to those particular embodiments, or otherwise than by the scope of the appended claims. It is also obvious that my novel fluid cylinder and cam lever may be useful in other arts as a medium of power transmission.

I claim:

1. Brake operating mechanism for a vehicle wheel brake of the internal expanding type having spaced apart ends, comprising, in combination, wedge means for spreading apart said spaced ends of the brake, a fluid operated piston and a toggle actuated thereby, one of the links of which is constructed and arranged to actuate said wedge means.

2. A brake assembly comprising in combination, a brake drum, friction means adapted to be moved into contact with said drum and formed with two spaced ends, a wedge cam positioned between said two ends, a hydraulic pressure cylinder, diverging toggle links pivotally connected at their inner ends and one having its outer end pivotally connected to said wedge cam and the other having its outer end pivoted to a fixed portion of the structure, a hydraulic piston in the cylinder having a wrist pin mounted therein, a thrust link pivoted to the wrist pin, and a floating pin connecting the inner ends of said diverging toggle links and said thrust link.

EUGENE V. TAYLOR.